United States Patent
Crombez

(10) Patent No.: US 9,002,608 B2
(45) Date of Patent: *Apr. 7, 2015

(54) ELECTRO-HYDRAULIC BRAKE-BY-WIRE SYSTEM AND METHOD

(75) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 736 days.

This patent is subject to a terminal disclaimer.

(21) Appl. No.: 12/702,366

(22) Filed: Feb. 9, 2010

(65) Prior Publication Data

US 2011/0160970 A1    Jun. 30, 2011

(51) Int. Cl.
*G06F 19/00* (2011.01)
*B60T 13/74* (2006.01)
*B60T 8/40* (2006.01)
*B60T 7/04* (2006.01)
*B60T 8/26* (2006.01)
*B60T 8/32* (2006.01)
*B60T 13/14* (2006.01)

(52) U.S. Cl.
CPC ............... *B60T 8/4077* (2013.01); *B60T 7/042* (2013.01); *B60T 8/267* (2013.01); *B60T 8/321* (2013.01); *B60T 13/147* (2013.01)

(58) Field of Classification Search
CPC ..... B60T 8/267; B60T 13/143; B60T 8/3265; B60T 8/3275
USPC .......................................... 303/3, 20; 701/70
See application file for complete search history.

(56) References Cited

U.S. PATENT DOCUMENTS

| | | | |
|---|---|---|---|
| 5,707,115 A | 1/1998 | Bodie et al. | |
| 5,927,825 A | 7/1999 | Schenk et al. | |
| 6,106,078 A | 8/2000 | Johnston et al. | |
| 6,205,379 B1* | 3/2001 | Morisawa et al. | 701/22 |
| 6,398,320 B1 | 6/2002 | Nowinski | |
| 6,547,343 B1 | 4/2003 | Hac | |
| 6,641,230 B2* | 11/2003 | Gegalski et al. | 303/113.2 |
| 6,837,552 B2 | 1/2005 | Reuter et al. | |
| 7,357,465 B2 | 4/2008 | Young et al. | |
| 7,367,187 B2 | 5/2008 | Ikeda et al. | |
| 7,395,667 B2* | 7/2008 | Arnold | 60/545 |
| 2002/0050740 A1* | 5/2002 | Gegalski et al. | 303/139 |
| 2004/0135432 A1* | 7/2004 | Reuter et al. | 303/152 |
| 2005/0017574 A1* | 1/2005 | Weiberle et al. | 303/3 |
| 2006/0066146 A1* | 3/2006 | Otomo | 303/151 |
| 2006/0089777 A1 | 4/2006 | Riddiford et al. | |
| 2006/0163942 A1* | 7/2006 | Tsunehara et al. | 303/155 |
| 2007/0018498 A1 | 1/2007 | Nakazawa | |
| 2008/0017425 A1 | 1/2008 | Albrichsfeld et al. | |
| 2008/0234909 A1 | 9/2008 | Iwasaki et al. | |
| 2008/0302100 A1* | 12/2008 | Ohtani et al. | 60/545 |
| 2009/0045672 A1* | 2/2009 | Nishino et al. | 303/113.3 |
| 2009/0072615 A1* | 3/2009 | Oosawa et al. | 303/113.1 |
| 2009/0115242 A1* | 5/2009 | Ohtani et al. | 303/3 |
| 2009/0256417 A1* | 10/2009 | Ishii et al. | 303/152 |
| 2011/0254357 A1* | 10/2011 | Vollert et al. | 303/3 |

* cited by examiner

Primary Examiner — Marthe Marc-Coleman
(74) Attorney, Agent, or Firm — David Kelley, Esq.; Tung & Associates

(57) ABSTRACT

An electro-hydraulic brake-by-wire system includes a brake pedal, an electronic booster coupled to the brake pedal, a master cylinder coupled to the electronic booster, at least one front hydraulic brake disposed in fluid communication with the master cylinder, at least one electronic control unit connected to the brake pedal and at least one rear electronic brake connected to the at least one electronic control unit.

20 Claims, 2 Drawing Sheets

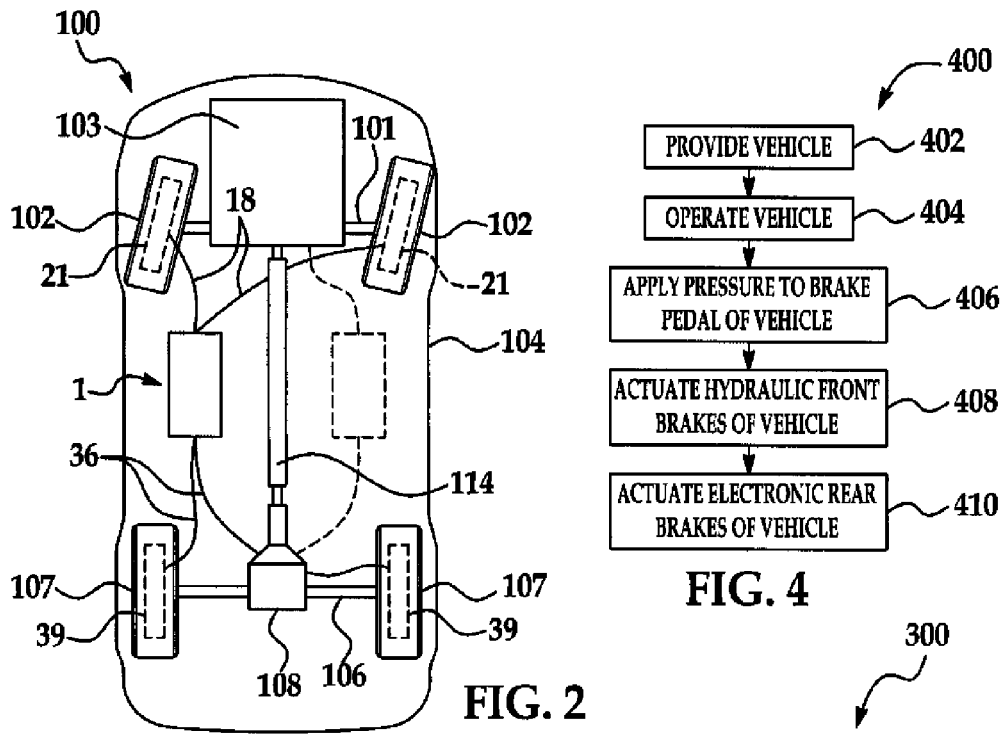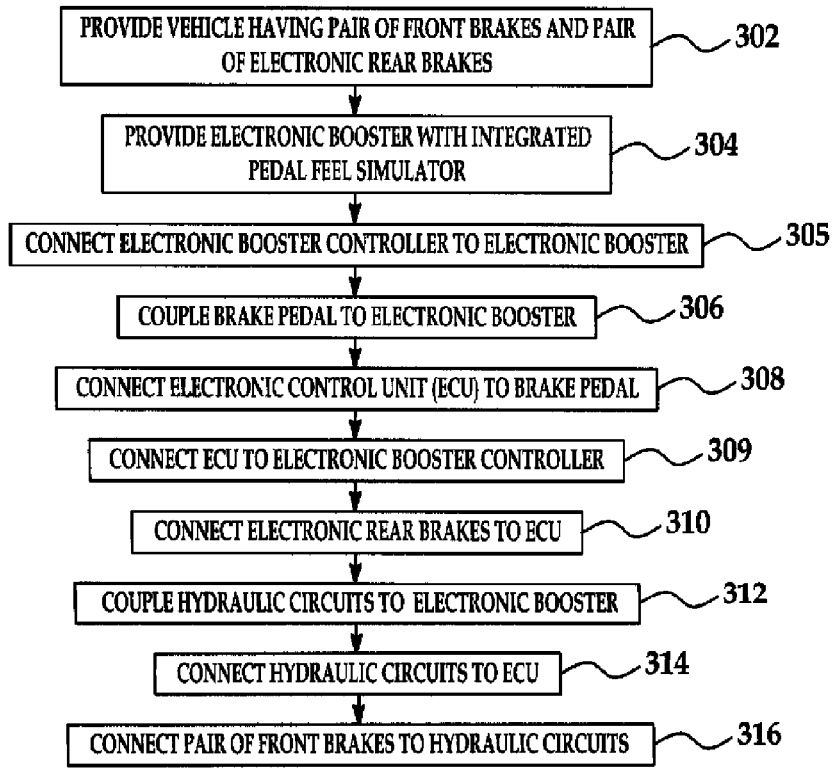

ELECTRO-HYDRAULIC BRAKE-BY-WIRE SYSTEM AND METHOD

CROSS-REFERENCE TO RELATED APPLICATIONS

This application is related to application Ser. No. 12/702,378, filed Feb. 9, 2010 and entitled "Electro-Hydraulic Brake Brake-By-Wire System and Method", and to application Ser. No. 12/702,399 filed Feb. 9, 2010 and entitled "Electronic Brake Actuator Brake-By-Wire System and Method".

TECHNICAL FIELD

The disclosure generally relates to brake systems for vehicles. More particularly, the disclosure relates to an electro-hydraulic brake-by-wire system having electronic rear brakes and an electronic booster which may include an integrated pedal feel simulator, and an electro-hydraulic brake-by-wire method.

BACKGROUND

Full hybrid vehicles may have brake-by-wire systems to facilitate coordinated or series regenerative braking. Brake-by-wire system architectures in production generally fall under one of 3 categories: electromechanical systems, which utilize electronic calipers; electro-hydraulic systems, which typically utilize a high-pressure accumulator with analog hydraulic valves to generate pressure that is applied to individual or multiple wheels; and active booster based systems, which utilize an active boosters (either vacuum or hydraulic) to generate controlled boosted hydraulic pressure, via a conventional brake master cylinder, that is applied to the wheel or wheels. These system architectures each have advantages and disadvantages in areas such as cost, package, durability and complexity. For example, the vacuum-based brake-by-wire system may be characterized by lower cost with some functional advantages but may lack other functionalities that the other systems provide. The vacuum-based brake-by-wire system typically requires an active booster in conjunction with a vacuum supply (electric vacuum pump) and a pedal-mounted brake feel simulator unit. This arrangement may prevent independent front/rear braking pressure control and may have other disadvantages as well.

Therefore, an electro-hydraulic brake-by-wire system and method are needed in which the rear hydraulic brakes of a conventional vacuum-based brake-by-wire system are replaced with electronic brakes and the active booster, vacuum pump and pedal-mounted simulator unit of the vacuum-based brake-by-wire system are replaced by an electronic booster which may include an integrated pedal feel simulator to provide cost, package and functional improvements.

SUMMARY

The disclosure is generally directed to an electro-hydraulic brake-by-wire system. An illustrative embodiment of the electro-hydraulic brake-by-wire system includes a brake pedal, an electronic booster coupled to the brake pedal, a master cylinder coupled to the electronic booster, at least one front hydraulic brake disposed in fluid communication with the master cylinder, an electronic control unit connected to the brake pedal and at least one rear electronic brake connected to the electronic control unit.

The disclosure is further generally directed to a vehicle. An illustrative embodiment of the vehicle includes a chassis; a front axle and a rear axle carried by the chassis; a front pair of wheels and a rear pair of wheels carried by the front axle and the rear axle, respectively; and a drive mechanism drivingly engaging at least one of the front axle and the rear axle. An electro-hydraulic brake-by-wire system includes a brake pedal, an electronic booster coupled to the brake pedal, a master cylinder coupled to the electronic booster, at least one front hydraulic brake disposed in fluid communication with the master cylinder and adapted to engage at least one of the front pair of wheels, an electronic control unit connected to the brake pedal and at least one rear electronic brake connected to the electronic control unit and adapted to engage at least one of the rear pair of wheels.

The disclosure is further generally directed to an electro-hydraulic brake-by-wire method. An illustrative embodiment of the method includes providing a vehicle having a pair of front brakes and a pair of rear brakes, providing an electronic booster, coupling a brake pedal to the electronic booster, connecting an electronic control unit to the brake pedal, connecting at least one of the pair of rear brakes to the electronic control unit and connecting at least one of the pair of front brakes to the electronic booster.

BRIEF DESCRIPTION OF THE DRAWINGS

The disclosure will now be made, by way of example, with reference to the accompanying drawings, in which:

FIG. 2 is a schematic diagram of a vehicle fitted with an illustrative embodiment of the electro-hydraulic brake-by-wire system.

FIG. 3 is a flow diagram of an illustrative embodiment of an electro-hydraulic brake-by-wire method.

FIG. 4 is a flow diagram of an illustrative embodiment of a method of operating an electro-hydraulic brake-by-wire system.

DETAILED DESCRIPTION

Figure 1:
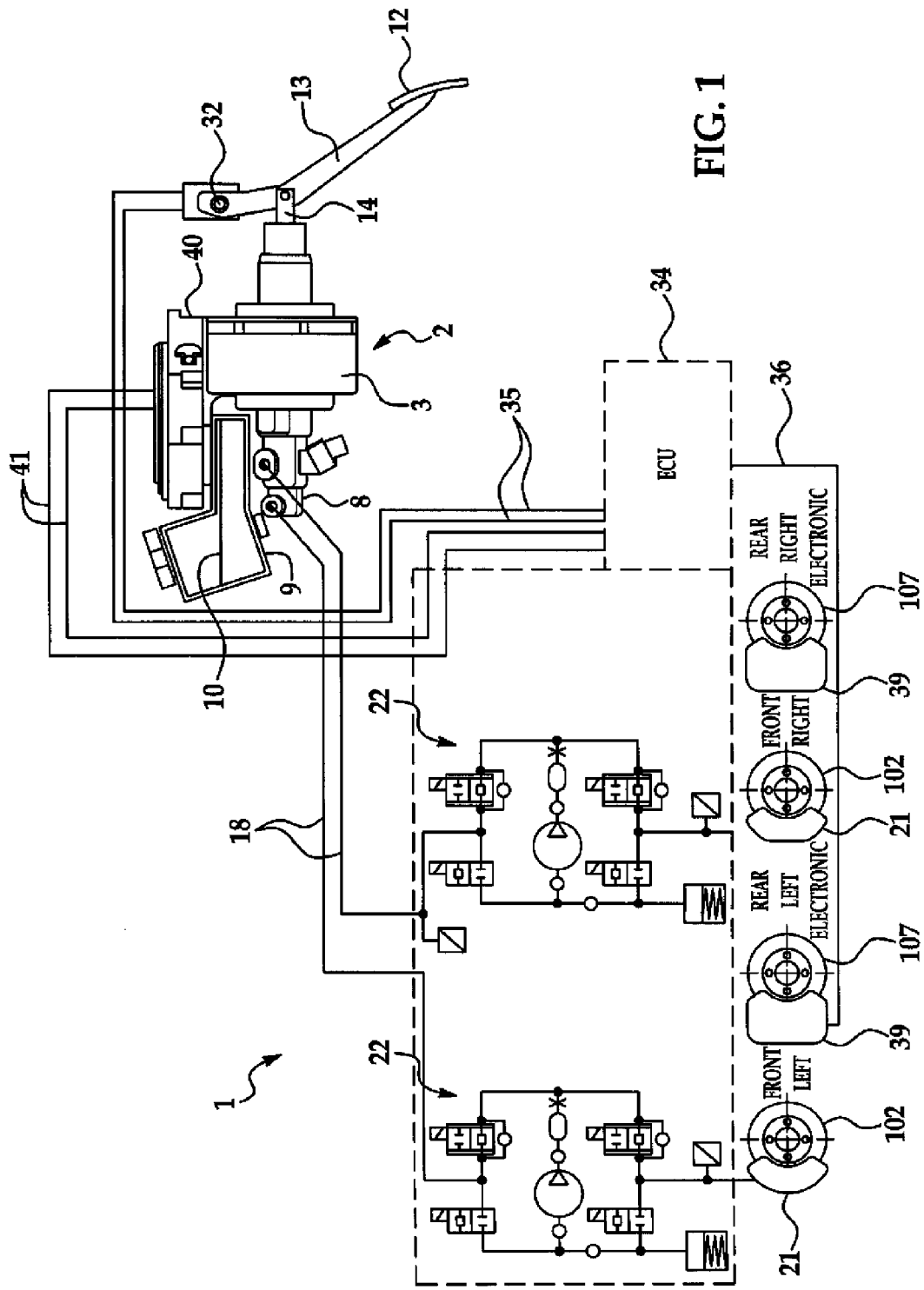
FIG. 1 is a schematic diagram of an illustrative embodiment of the electro-hydraulic brake-by-wire system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Referring initially to FIGS. 1 and 2, an illustrative embodiment of the electro-hydraulic brake-by-wire system, hereinafter system, is generally indicated by reference numeral 1. As shown in FIG. 2, the system 1 may be suitable for implementation in conjunction with an electric vehicle 100 such as a plug-in hybrid electric vehicle (HEV), for example and without limitation. Generally, the electric vehicle 100 may include a vehicle chassis 104 having a front axle 101 and a rear axle 106. The front axle 101 may be fitted with a pair of front wheels 102. The rear axle 106 may be fitted with a pair of rear wheels 107.

An internal combustion engine 103 may drivingly engage at least one of the front axle 101 and the rear axle 106. Additionally or alternatively, an electric motor 108 may drivingly engage at least one of the front axle 101 and the rear axle 106. A rechargeable battery (not shown) may be connected to the electric motor 108. The rechargeable battery may be capable of being recharged with electrical power at a charging destination (not shown) via suitable plug-in electrical equipment, as is known to those skilled in the art. The electric vehicle 100 may be adapted for propulsion by the front wheels 102 via the front axle 101 and/or by the rear wheels 107 via the rear axle 106 through engagement of the internal combustion engine 103. The electric vehicle 100 may additionally or alternatively be adapted for propulsion by the front wheels 102 via the front axle 101 and/or by the rear wheels 107 via the rear axle 106 through engagement of the electric motor 108. As will be hereinafter further described, the system 1 may be operable to apply brake pressure to the front wheels 102 and the rear wheels 107 of the vehicle 100.

As shown in FIG. 1, the system 1 may include an electronic booster 2 which may have an integrated pedal feel simulator 3 (internal to booster 2). An example of an electronic booster 2, which is suitable for the purpose, is that which is disclosed in U.S. Pat. No. 7,367,187 and U.S. Pat. Application No. 2008/0302100 and 2009/0217659, which is incorporated by reference herein in its entirety. A master cylinder 8 may be coupled to the electronic booster 2. A hydraulic fluid reservoir 9 which contains a supply of hydraulic fluid 10 may be disposed in fluid communication with the master cylinder 8. A brake pedal 12 of the vehicle 100 may be provided on an elongated pedal arm 13 which is coupled to the integrated pedal feel simulator 3 of the electronic booster 2 through a push rod 14.

A pair of front hydraulic brake circuits 22 may be disposed in fluid communication with the master cylinder through respective hydraulic lines 18. The front hydraulic brake circuits 22 may be operably connected to a pair of respective front hydraulic brakes 21 which may be adapted to apply hydraulically-actuated brake pressure to the respective front vehicle wheels 102 of the vehicle 100 (FIG. 2), as will be hereinafter further described.

A pedal travel or angle sensor 32 may be coupled to the pedal arm 13. An electronic control unit (ECU) 34 may be connected to the pedal travel sensor 32 through ECU wiring 35. A pair of rear electronic brakes 39 may be connected to the ECU 34 through brake wiring 36. The rear electronic brakes 39 may be adapted to apply electrically-actuated brake force to the respective rear vehicle wheels 107 of the vehicle 100 (FIG. 2). The ECU 34 may additionally be connected to the electronic booster controller 40 through electronic booster wiring 41. The ECU 34 may additionally be connected to the valves, pumps and other various control components (not labeled) of each of the front hydraulic brake circuits 22. It may be noted that although controls of system 1 has been described to be provided by ECU 34, the controls may be distributed to one of many separate controllers not shown.

In operation of the vehicle 100, the internal combustion engine 103 and/or the electric motor 108 applies torque to the front wheels 102 and the rear wheels 107 to propel the vehicle 100 on a surface (not shown). Braking is applied to the vehicle 100 as a vehicle operator (not shown) applies pressure to the brake pedal 12. Accordingly, the pedal arm 13 actuates the electronic booster 2 of the system 1 through the push rod 14. The electronic booster 2 pressurizes and facilitates flow of hydraulic fluid 10 from the master cylinder 8 and through the hydraulic lines 18 and the respective front hydraulic brake circuits 22. The hydraulic fluid 10 which flows through the front hydraulic brake circuits 22 causes each front hydraulic brake 21 to apply brake pressure against the corresponding front wheel 102. Depending on the functionality of the system 1, the ECU 34 controls the valves, pumps and other components (not indicated) of each of the front hydraulic brake circuits 22 to facilitate flow of hydraulic fluid through the front hydraulic brake circuits 22 to each front hydraulic brake 21. Said functionality may include but are not limited to anti-lock brake control (ABS), electronic stability control (ESC), roll stability control (RSC), hill launch assist (HLA), or any other advanced brake function know to those skilled in the art.

The pedal arm 13 also actuates the pedal travel sensor 32, which transmits an activation signal (not shown) to the ECU 34 through the ECU wiring 35. The ECU 34 transmits a braking signal (not shown) through the brake wiring 36 to each rear electronic brake 39, which applies brake force to each corresponding rear wheel 107. The resulting brake force which is applied to the front wheels 102 and the rear wheels 107 slows or stops the vehicle 100.

The ECU 34 also may be configured to actuate the electronic booster 2 and/or each rear electronic brake 39 independent of any travel from brake pedal 12. This capability may be necessary to provide autonomous braking needed for other advanced braking functions such as, but not limited to, adaptive cruise control (ACC), coordinated regenerative braking or others known to those skilled in the art.

It will be appreciated by those skilled in the art that the integrated rear electric brakes 39 of the system 1 offers numerous benefits including package and function improvements over conventional brake arrangements, particularly with the increased use of electric park brakes. The system 1 may utilize common ABS/ESC controls which are common to conventional vacuum brake systems. The front hydraulic brakes 21 may allow for enhanced system sizing of the master cylinder 8 and pedal ratio of the pedal arm 13 to improve boost brake performance. Additionally, the front hydraulic brakes 21 may allow for a smaller electronic booster 2 which may improve packaging and cost constraints. The front hydraulic brakes 21 may allow for a smaller hydraulic control unit with removal of at least four valves, two pressure sensors and a pump. The rear electronic brakes 39 may provide backup braking to the vehicle 100 under some conditions.

Referring next to FIG. 3, a flow diagram 300 of an illustrative embodiment of an electro-hydraulic brake-by-wire method is shown. In block 302, a vehicle having a pair of front brakes and a pair of electronic rear brakes is provided. In some embodiments, the vehicle may be a hybrid electric vehicle (HEV). In block 304, an electronic booster with an integrated pedal feel simulator is provided. In block 305, an electronic booster controller is coupled to the electronic booster. In block 306, the brake pedal is coupled to the electronic booster. In block 308, an electronic control unit (ECU) is connected to the brake pedal. In block 309, the ECU is connected to the electronic booster controller. In block 310, the electronic rear brakes of the vehicle are connected to the ECU. In block 312, hydraulic circuits are coupled to the electronic booster. In block 314, the hydraulic circuits are connected to the ECU. In block 316, the front brakes of the vehicle are connected to the hydraulic circuits.

Referring next to FIG. 4, a flow diagram 400 of an illustrative embodiment of a method of operating an electro-hydraulic brake-by-wire system is shown. In block 402, a vehicle is provided. In some applications, the vehicle may be a hybrid electric vehicle. The vehicle may include a pair of hydraulic front brakes and a pair of electronic rear brakes, at least one electronic booster connected to at least one of the pair of hydraulic front brakes, a brake pedal coupled to the at least one electronic booster, at least one electronic control unit connected to the brake pedal and to the at least one electronic booster and at least one of the pair of electronic rear brakes connected to the at least one electronic control unit. In block 404, the vehicle is operated. In block 406, pressure is applied to the brake pedal of the vehicle. In block 408, the hydraulic front brakes of the vehicle are actuated. In block 410, the electronic rear brakes of the vehicle are actuated. In some applications, a pedal travel sensor may be coupled to the brake pedal and the at least one electronic control unit. An activation signal may be transmitted from the pedal travel sensor to the at least one electronic control unit. A braking signal may be transmitted from the at least one electronic control unit to the at least one of the pair of electronic rear brakes.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An electro-hydraulic brake system, comprising:
   a brake pedal;
   an electronic booster coupled to said brake pedal and connected to at least one electronic control unit;
   a master cylinder coupled to said electronic booster;
   at least one front hydraulic brake disposed in fluid communication with said master cylinder;
   said at least one electronic control unit connected to said brake pedal;
   at least one rear electronic brake connected to said at least one electronic control unit; and
   wherein said at least one electronic control unit is configured to actuate said electronic booster and said at least one rear electronic brake in response to sensed brake pedal travel and wherein said at least one electronic control unit is further configured to actuate at least one of said electronic booster and said at least one rear electronic brake independent of said sensed travel of said brake pedal, said at least one electronic control unit further configured to independently control braking pressure applied to each of said at least one rear electronic brake and said at least one front hydraulic brake.

2. The system of claim 1 wherein said electronic booster comprises an integrated pedal feel simulator coupled to said brake pedal.

3. The system of claim 2 further comprising a pedal arm and wherein said brake pedal is carried by said pedal arm and said integrated pedal feel simulator is coupled to said pedal arm.

4. The system of claim 3 further comprising a pedal/simulator coupling connecting said integrated pedal feel simulator to said pedal arm.

5. The system of claim 1 further comprising a pedal input sensor coupled to said brake pedal and wherein said electronic control unit is connected to said pedal travel sensor.

6. The system of claim 1 wherein said at least one front hydraulic brake disposed in fluid communication with said master cylinder comprises a pair of front hydraulic brakes disposed in fluid communication with said master cylinder.

7. The system of claim 6 wherein said at least one rear electronic brake connected to said at least one electronic control unit comprises a pair of rear electronic brakes connected to said at least one electronic control unit.

8. A vehicle, comprising:
   a chassis;
   a front axle and a rear axle carried by said chassis;
   a front pair of wheels and a rear pair of wheels carried by said front axle and said rear axle, respectively;
   a drive mechanism drivingly engaging at least one of said front axle and said rear axle; and
   an electro-hydraulic brake system comprising:
   a brake pedal;
   an electronic booster coupled to said brake pedal and connected to at least one electronic control unit;
   a master cylinder coupled to said electronic booster;
   at least one front hydraulic brake disposed in fluid communication with said master cylinder and adapted to engage at least one of said front pair of wheels;
   said at least one electronic control unit connected to said brake pedal;
   at least one rear electronic brake connected to said at least one electronic control unit and adapted to engage at least one of said rear pair of wheels; and
   wherein said at least one electronic control unit is configured to actuate said electronic booster and said at least one rear electronic brake in response to sensed brake pedal travel and wherein said at least one electronic control unit is further configured to actuate at least one of said electronic booster and said at least one rear electronic brake independent of said sensed travel of said brake pedal, said at least one electronic control unit further configured to independently control braking pressure applied to each of said at least one rear electronic brake and said at least one front hydraulic brake.

9. The vehicle of claim 8 wherein said drive mechanism comprises at least one electric motor drivingly engaging at least one of said front axle and said rear axle and an internal combustion engine providing power to at least one of said front axle and said rear axle.

10. The vehicle of claim 8 wherein said electronic booster comprises an integrated pedal feel simulator coupled to said brake pedal.

11. The system of claim 10 further comprising a pedal arm and wherein said brake pedal is carried by said pedal arm and said integrated pedal feel simulator is coupled to said pedal arm.

12. The system of claim 11 further comprising a pedal/simulator coupling connecting said integrated pedal feel simulator to said pedal arm.

13. The system of claim 8 further comprising a pedal input sensor coupled to said brake pedal and wherein said electronic control unit is connected to said pedal input travel sensor.

14. The system of claim 8 wherein said at least one front hydraulic brake disposed in fluid communication with said master cylinder comprises a pair of front hydraulic brakes disposed in fluid communication with said master cylinder.

15. The system of claim 8 wherein said at least one rear electronic brake connected to said at least one electronic control unit comprises a pair of rear electronic brakes connected to said at least one electronic control unit.

16. A method of operating an electro-hydraulic brake-by-wire system, comprising:
   providing a vehicle having a pair of hydraulic front brakes and a pair of electronic rear brakes, at least one electronic booster connected to at least one of said pair of hydraulic front brakes, a brake pedal coupled to said at least one electronic booster, at least one electronic control unit connected to said brake pedal and to said at least one electronic booster and at least one of said pair of electronic rear brakes connected to said at least one electronic control unit;

configuring said at least one electronic control unit to actuate said electronic booster and said pair of electronic rear brakes in response to sensed brake pedal travel and further configuring said at least one electronic control unit to actuate at least one of said electronic booster and said at least one rear electronic brake independent of said sensed travel from said brake pedal, said at least one electronic control unit further configured to independently control braking pressure applied to each of said at least one rear electronic brake and said at least one front hydraulic brake;

operating said vehicle;

applying pressure to said brake pedal;

actuating said hydraulic front brakes; and actuating said electronic rear brakes.

17. The method of claim 16 wherein said providing a vehicle comprises providing a hybrid electric vehicle.

18. The method of claim 16 wherein said providing a vehicle having at least one of said pair of electronic rear brakes connected to said at least one electronic control unit comprises providing a vehicle having both of said pair of rear brakes connected to said at least one electronic control unit.

19. The method of claim 18 wherein said providing a vehicle having at least one electronic booster connected to at least one of said pair of hydraulic front brakes comprises providing a vehicle having at least one electronic booster connected to both of said pair of hydraulic front brakes.

20. The method of claim 16 wherein said providing a vehicle comprises providing a vehicle having a pedal travel sensor coupled to said brake pedal and said at least one electronic control unit and further comprising transmitting an activation signal from said pedal travel sensor to said at least one electronic control unit and transmitting a braking signal from said at least one electronic control unit to said at least one of said pair of electronic rear brakes.

\* \* \* \* \*